July 15, 1947. E. M. HAMMER 2,424,163
FLUID MIXING APPARATUS
Filed Aug. 10, 1945
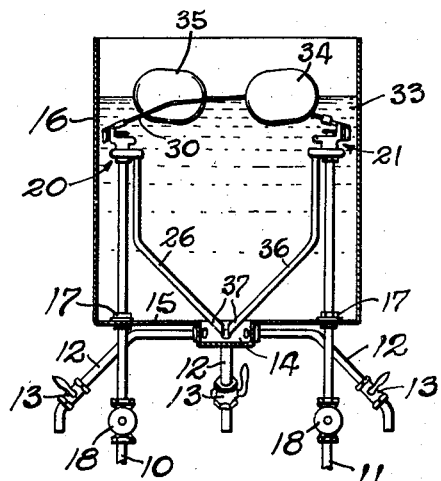
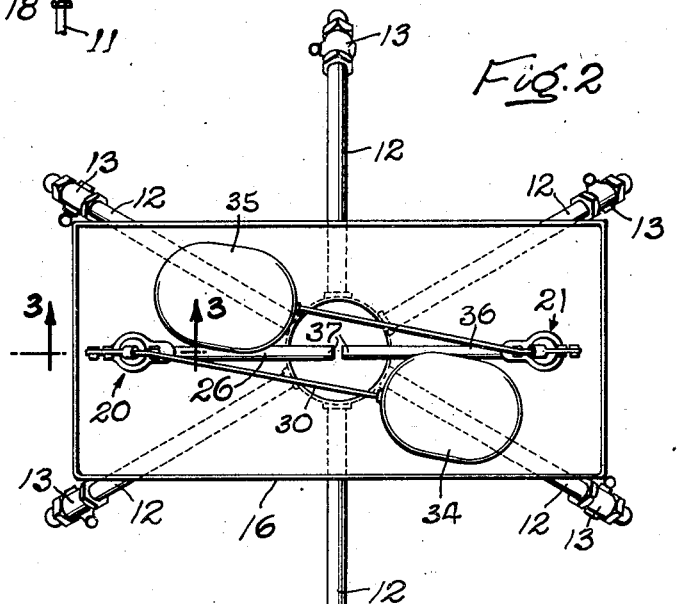
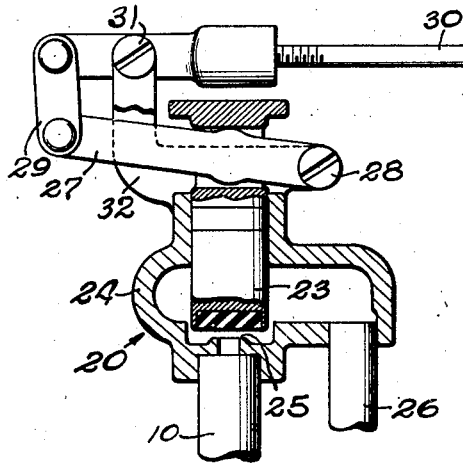
INVENTOR
Edwin M. Hammer
By Carlson, Pitzner, Hubbard & Wolfe
ATTORNEYS Patented July 15, 1947

2,424,163

UNITED STATES PATENT OFFICE 2,424,163

FLUID MIXING APPARATUS

Edwin M. Hammer, Rockford, Ill.

Application August 10, 1945, Serial No. 610,089

3 Claims. (Cl. 137—78)

This invention relates to an apparatus for mixing fluids such as hot and cold water, and the primary object is to provide an apparatus which will maintain the desired proportions of the liquids over long periods of service use without danger of leakage.

A more detailed object is to provide such an apparatus in which the liquids to be mixed are delivered simultaneously in the desired proportions to a tank whenever the mixed liquid is withdrawn from the tank.

Another object is to control the delivery of the liquids to the tank by individual float actuated valves.

Other objects and advantages of the invention will become apparent from the following detailed description taken in connection with the accompanying drawings, in which Figure 1 is an elevational view of the improved mixing apparatus, the tank being shown in vertical section.

Fig. 2 is a plan view.

Fig. 3 is a section taken along the line 3—3 of Fig. 2.

While the invention is adapted for use in mixing various kinds and numbers of liquids, it is especially suited for mixing hot and cold water supplied to pipes 10 and 11 and proportioned to produce a mixture of the desired temperature which may be drawn out of one or more outlet pipes 12 by manually opening a valve 13 provided in each outlet. In the present instance, the pipes 12 lead out of the side wall of a relatively small well 14 in the bottom 15 of a tank 16.

Herein the inlet pipes 10 and 11 extend into the tank through seals 17 in the bottom 15 on opposite sides of the well. Manually operable globe valves 18 interposed in the inlet pipes below the tank may be adjusted individually to vary the relative proportion of the two liquids delivered through the inlets. At the upper ends, the pipes 10 and 11 are connected to and support valves 20 and 21 which are of the standard float type having a member 23 (Fig. 3) slidable in a casing 24 toward and from a seat 25 to interrupt or permit the flow of liquid out through a pipe 26. The upper end of the valve member projects from the casing and is slotted to receive a lever 27 having one end pivoted on the casing at 28 and the other end connected through a link 29 to one end of a lever 30. Near this end, the lever is fulcrumed at 31 on a bracket 32. A float 34 of standard construction is rigid with the other end of the lever which is of the length or curvature required to initiate opening of the valve when the level of the liquid 33 in the tank falls below a predetermined point near the upper end of the tank.

The valve 21 is similarly actuated by a float 35 and when open delivers liquid downwardly through a pipe 36. This pipe and the pipe 26 are bent toward the center of the tank, and their lower ends 37 terminate closely adjacent each other and within the well 14. Preferably, the ends are directed toward each other as shown so that the streams discharged therefrom impinge against each other thereby causing immediate mixing of the fluids within the well 14. As a result, the water drawn from any of the outlets 12 will be of the desired temperature almost immediately, even though the remainder in the tank may have cooled down somewhat following the last withdrawal.

In order to insure uniformity in the proportion of the mixed liquids as determined by the setting of the valves 18, the valves 20 and 21 are of the same size, and their float actuators are adjusted quite closely to effect simultaneous opening and closure of the two valves. This is accomplished in the usual way by bending the levers 30 or adjusting the lengths thereof. As shown in Fig. 2, the levers are spaced apart and extend substantially parallel to each other so that the floats 34 and 35 are disposed on opposite sides of the tank, which may therefore be made of minimum width.

It will be apparent that the apparatus above described is simple and inexpensive in construction, yet extremely reliable and uniform in its operation because it employs valves of proven ruggedness and reliability.

I claim as my invention:

1. Mixing apparatus comprising a tank having a well in the bottom thereof, a valve controlled outlet leading from said well, pipes for different fluids leading into said tank and having discharge ends terminating adjacent each other in said well to cause immediate mixture of the discharged liquids adjacent said outlet, each of said pipes having a valve controlling the flow of fluid therethrough, actuators for said valves including floats responsive to changes in the level of the fluid in said tank and adjusted to open said valves simultaneously with the fall of the liquid in said tank below a predetermined level, and independently operable valves controlling the flow of the fluids through said pipes to vary the proportions of the fluids in the mixture.

2. Mixing apparatus comprising a tank having a valve controlled outlet, inlets for admitting different fluids to said tank and discharging into the latter at points closely adjacent to each other and to said outlet, and valves controlling the flow of fluids through said inlets and having individual float actuators, said actuators having floats adjusted to initiate opening of said valves simultaneously when the liquid in said tank falls below a predetermined level.

3. Mixing apparatus comprising a liquid container having an outlet, a valve in said outlet manually operable to permit the gravitational withdrawal of liquid from said container, inlets for admitting fluids to said container, valves controlling the admission of fluids through said inlets to said container and having individual actuators, means for operating said actuators to open said valves simultaneously in response to a fall of the liquid level in said container below a predetermined point, and other means selectively adjustable to vary the proportion of the liquids delivered through the respective inlets.

EDWIN M. HAMMER.

REFERENCES CITED

The following references are of record in the file of this patent:

UNITED STATES PATENTS

| Number | Name | Date |
|---|---|---|
| 2,065,128 | Eisenger | Dec. 22, 1936 |
| 1,707,058 | Kauwertz | Mar. 26, 1929 |

FOREIGN PATENTS

| Number | Country | Date |
|---|---|---|
| 624,867 | Germany | 1936 |